(12) United States Patent
Rouse (10) Patent No.: US 10,194,651 B2
(45) Date of Patent: *Feb. 5, 2019

(54) ANIMAL CALL

(71) Applicant: Andrew J. Rouse, Avon, CO (US)

(72) Inventor: Andrew J. Rouse, Avon, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/333,585

(22) Filed: Oct. 25, 2016

(65) Prior Publication Data

US 2017/0035045 A1    Feb. 9, 2017

Related U.S. Application Data (63) Continuation-in-part of application No. 14/699,211, filed on Apr. 29, 2014, now Pat. No. 9,554,571.

(51) Int. Cl.
*A01M 31/00*   (2006.01)

(52) U.S. Cl.
CPC ................... *A01M 31/004* (2013.01)

(58) Field of Classification Search
CPC ............................ A01M 31/00; A01M 31/004
See application file for complete search history.

(56) References Cited

U.S. PATENT DOCUMENTS

| | | | | |
|---|---|---|---|---|
| 209,274 A | * | 10/1878 | LaMontagne | A01M 31/004 446/208 |
| 2,439,736 A | * | 4/1948 | Horne | G10K 9/02 446/416 |
| 2,551,680 A | * | 5/1951 | Kipling | A63H 5/00 446/193 |
| 2,584,549 A | * | 2/1952 | Carhart | A01M 31/004 446/202 |
| 2,711,614 A | * | 6/1955 | Halsten | 446/208 |
| 3,579,903 A | * | 5/1971 | Stewart | A01M 31/004 446/208 |
| 3,815,283 A | | 6/1974 | Piper | |
| 4,030,241 A | * | 6/1977 | Gallagher | A01M 31/004 446/202 |
| 4,258,498 A | * | 3/1981 | Aughey | A63H 5/00 124/64 |
| 4,637,154 A | * | 1/1987 | Laubach | A01M 31/06 43/1 |
| 4,761,149 A | * | 8/1988 | Laubach | A01M 31/004 446/205 |
| 5,030,159 A | * | 7/1991 | Beer | A63H 5/00 446/207 |
| 5,830,036 A | | 11/1998 | Richardson | |
| 5,885,126 A | | 3/1999 | Carlson | |
| 6,045,429 A | * | 4/2000 | Marino | A01M 31/004 446/207 |
| 6,083,075 A | | 7/2000 | Meeks | |
| 6,168,493 B1 | | 1/2001 | Kirby | |

(Continued)

*Primary Examiner* — Gene Kim
*Assistant Examiner* — Alyssa Hylinski (57) ABSTRACT

A device for producing an animal sound such as an elk, deer, or turkey vocalization, the device having two pivotably or vertically connected portions, one portion bearing a bent vibratable reed and the other a compressible foam lining, wherein the sound is produced by blowing air over the reed, the pitch being adjustable by pivoting the portions to be more or less parallel to each other or moving the portions vertically to be closer together or further apart. In another embodiment, there is a single reed-bearing portion, the tongue serving in place of the foam-lined portion.

27 Claims, 8 Drawing Sheets

(56) References Cited

U.S. PATENT DOCUMENTS

| | | | |
|---|---|---|---|
| 6,231,418 B1 * | 5/2001 | Hancock | A01M 31/004 446/207 |
| 6,234,859 B1 | 5/2001 | Primos et al. | |
| 6,308,876 B1 | 10/2001 | Havens | |
| 6,357,159 B1 | 3/2002 | Bowling | |
| 6,575,804 B1 | 6/2003 | Primos | |
| 6,709,309 B1 * | 3/2004 | Bishop | A01M 31/004 446/188 |
| 7,011,563 B2 | 3/2006 | Ady | |
| 7,462,091 B1 | 12/2008 | Bean | |
| 7,553,210 B1 * | 6/2009 | Keller, Jr. | A01M 31/004 446/202 |
| 7,785,166 B1 | 8/2010 | Kirby | |
| 8,016,638 B1 | 9/2011 | Kirby | |
| 8,142,253 B2 | 3/2012 | Peel | |
| 8,727,828 B2 | 5/2014 | Pribbanow | |
| 9,554,571 B2 * | 1/2017 | Rouse | A01M 31/004 |
| 2009/0258566 A1 | 10/2009 | May | |

* cited by examiner

FIG. 12B

ANIMAL CALL

This application is a continuation-in-part of U.S. Ser. No. 14/699,211, filed Apr. 29, 2015, still pending. It also claims partial priority under 35 USC 119 from Canadian Ser. No. 2928395, filed Apr. 28, 2016. The above-cited prior applications are hereby incorporated by reference herein, in their entirety.

BACKGROUND OF THE INVENTION

Field of the Invention

This invention is directed to a device (a "call" or "reel") for attracting attention of an animal, with particular reference to a game animal, such as a game bird (e.g. turkey) or mammal (e.g., an elk, deer, rabbit).

Description of the Background Art

The device of the present invention may be used to attract the attention of any animal with vocalization and hearing capability, but usually will be used to attract a mammal or bird. The animal is usually an animal of a species that uses vocal communications. The animal may be a domestic animal, game animal, or pest animal, and these categories are not necessarily mutually exclusive. The mammals of interest include ungulates, including the order Artiodactyla (such as elk and deer) and order Perissodactyla; the order Carnivora, including the families Canidae (such as coyotes, wolves, foxes), the Ursidae (bears), Felidae (such as predatory cats), and Mustelidae (weasels). The birds of interest include the order Anseriformes (waterfowl, such as ducks, geese, swan), and Galliformes (such as turkeys, quail, partridge, grouse, pheasants).

Calls for elk are of particular interest; comments on elk apply mutatis mutandis to other animals. The elk (*Cervus canadensis*) is one of the largest species of the Cervidae (deer family) in the world, and one of the largest land mammals in North America and eastern Asia.

Elk make vocalizations for a variety of purposes, including warning other elk of danger, expressing distress if injured or trapped, maintaining contact with other members of the herd, and, in the case of bull elk, expressing dominance (warning away rival bulls and attracting cows).

An elk call may be used to attract an elk for purposes of hunting, wildlife observation or wildlife photography. Elk hunting has grown in popularity over the past 20 years by leaps and bounds. Elk have become increasingly more pressured and have responded by changing their behavior and adapting to being more nocturnal and educated to the ways of hunters. They don't respond to calls as readily and tend to hide out in the deepest darkest corners of elk country which makes them very hard to locate.

Bean, U.S. Pat. No. 7,462,091 describes an apparatus with a bellows coupled to a reed for calling game. The apparatus also features a reed controller, operable by contact with the bellows, to change the pitch of the sound. However, there is no pivot action to alter the pitch as in preferred embodiments of the present invention. The design of the present invention uses no bellows and the reed (or reeds) are completely different in composition of materials, shape and orientation.

Ady (Laubach), U.S. Pat. No. 7,011,563 describes a "two-sided" game call featuring a plurality of cylindrical/tubular reeds and contoured surfaces beneath the reeds. The mouthpiece extends beyond the main body of the device. The reeds of the present invention are bent, first to or starting at approximately a 45 degree slope and then changing to a horizontal slope. There is no mouthpiece that extends beyond the device.

Primos, U.S. Pat. No. 6,575,804 discloses a game calling apparatus with a mouthpiece protruding beyond the main body of the device. The sound is manipulated by moving a pressure point structure along the reed to alter its reed contact point. Primos, U.S. Pat. No. 6,234,829 describes a moisture diverter system to direct moisture away from the reed. The call of the present invention has no mouth piece. There is no pressure point structure. It has a diaphragm instead of a forward facing reed. A lid pivots closed, pinching the airflow over a 45 degree angled ramp with a final plane that is horizontal from an upslope that catches more air and allows a sound to be created from the most delicate of airflow to a loud blast with full volume of air let through with the lid less tensioned.

Kirby, U.S. Pat. No. 6,168,493 teaches a box-type game (especially turkey) call wherein a sound is generated by the impact of a paddle against an edge. Other box-type calls are described by Peel, U.S. Pat. No. 8,142,253; Richardson U.S. Pat. No. 5,830,036. The call of the present invention has no paddle. Air is blown through up and over a bent diaphragm that is slightly slack. It uses, in preferred embodiments, a diaphragm encased in a two parted box with a lid attached with a pin and band hinge at one end and open with a spring at the other to allow it to be played like an instrument.

Meeks, U.S. Pat. No. 6,083,075 describes an animal call with a protruding mouthpiece in which the sound is made by a vibrating reed and the sound is amplified by spaced-apart flexible diaphragms interconnected by a tension coil spring. The diaphragm in the call of the present invention needs no spacing.

Bishop, U.S. Pat. No. 6,709,309 discloses a game call with a diaphragm and a sliding plunger-type pump assembly for creating an airflow over the diaphragm. Bishop 309 mentions a foam sealing member 40 and gasket 42. The gasket is deflected toward a diaphragm in order to modify the sound produced by the diaphragm. The call of the present invention does not use a plunger and its diaphragm is not planar. Rather, it is bent. Air flow causes it to vibrate against a foam-lined lid after the reed bends up to a horizontal plane from the initial approximately 45 degree slope. The preferred pivoting motion of the lid allows infinite playability and control of sound as well as sound that is not able to be duplicated with any other diaphragm call. This play flexibility is at least in part attributable to the precise pressure that can be applied, thanks in turn to the spring loaded lid and delicate pressure sensitivity of the foam.

Kirby U.S. Pat. No. 8,016,638 teaches a mouth-operated game call comprising a diaphragm. The housing includes foam, but it is designed to provide improving sealing against the roof of the mouth and reduce tongue discomfort, rather than to alter the acoustical character of the call. The call of the present invention doesn't seal against the roof of the mouth. In fact it encases the diaphragm in a spring-loaded pivotably or vertically connected device with a foam lining. This reduces the skill needed to operate a mouth diaphragm.

Pribbanow, U.S. Pat. No. 8,727,828 discloses a wild game call featuring pipes of variable length attached to a splitter.

Carlson, U.S. Pat. No. 5,885,126 describes a waterfowl or game call making use of a set of interchangeable chokes to alter the volume.

Piper, U.S. Pat. No. 3,816,283 describes a diaphragm-type game caller with a moisture-absorbent pad.

Griffin, US 2011/0287689 discloses a device for generating a stream of air; the device can be used as the source of an airflow by a connected "grunt" (call).

Kirby, U.S. Pat. No. 7,785,166 describes a game call making use of pressurized air from a bellows.

La Montagne, U.S. Pat. No. 209,274 describes a toy noisemaker. It features a tubular mouthpiece chamber containing a reed with two right-angle bends, with one segment of the reed touching and paralleling the top of the tubular chamber, a second segment crossing from top to bottom, and a third segment touching and paralleling the bottom of the tubular chamber. The tubular mouthpiece chamber communicates at the end distal to its mouthpiece end with an outer chamber formed by two truncated demi-ellipsoid cavities, one being in a pivotable top portion and the other in a fixed bottom portion. The pivotable connection between the two lies above the tubular chamber, at the end of the tubular chamber distal from the mouthpiece end.

Halsten, U.S. Pat. No. 2,711,614 describes a duck call comprising a mouthpiece and an outlet tube. The mouthpiece comprises, in the order of airflow, a tapering bore and a cylindrical bore. The tapering bore is narrowest at its end distal to the mouthpiece opening. The cylindrical bore is greater in diameter than that distal end of the tapering bore. The outlet tube is cylindrical but narrower in diameter than the cylindrical bore of the mouthpiece. The outlet tube fits partially inside the cylindrical bore, the part inside fitting snugly, and features a stem on the bottom thereof, extending further into the cylindrical bore. There is a semicircular portion at the end of the stem closest to the mouthpiece opening, protruding into the bore. From this semicircular portion, the top of the stem slopes downward and then becomes horizontal at it approaches the outlet end of the outlet tube. The reed is straight, and is suspended above the stem, being attached via a piece of cork to a downward protrusion of the top of the inside of the outer tube.

SUMMARY OF THE INVENTION

The animal call of the present invention comprises a vibratable reed, a compressible foam and means for altering the degree of compression, if any, of the foam against the reed (without necessarily deflecting or stretching the reed) wherein the sound produced is altered depending on the degree of compression of the foam against the reed during operation of the device. Thus, in some embodiments, the foam is compressed against the reed, without substantially deflecting the reed, in one operating state and drawn away from the reed in another operating state.

The objects of the invention include the following:

to provide an animal call that permit the user to imitate the vocalizations of male and female animals, especially elk;

to provide an animal call that can make the same sound (i.e. the same sequence of pitches and duration of each pitch) at low or high volume;

to provide an animal call that simulates the effect of the spongy tissue in the voice box of the animal (especially elk) by means of vibration of the reed against a foam;

to provide an animal call that modulates pitch by altering the degree of compression of the foam, e.g. by a pivoting action that modifies the angle that a foam surface makes with the reed;

to provide an animal call in which the reed is disposed in a bent shape disposed so that the air flow is up and over the reed, and in which the reed is not taut, so as to better simulate the animal, especially elk, vocalization; and to provide an animal (especially elk) call in which the slackness of the reed is readily adjustable.

Other objects and advantages of the invention will be evident from the remainder of this specification.

In a preferred embodiment, the animal call comprises:

a top portion having an inside facing surface lined with a closed cell foam;

a bottom portion having a slot (throat chamber) in an inside facing surface extending partially into the bottom portion from a first edge, the slot ramping up to the inside surface at an end opposite the first edge; and a v-shaped groove in the inside facing surface, the v-shaped groove opening out toward a second edge of the bottom portion opposite the first edge;

where the top and bottom portions are pivotally affixed near the first edge and a spring is disposed between the top and bottom portions near the second edge.

At least one reed is disposed across a part of the inside facing surface of the bottom portion; the reed is oriented with a long edge parallel to the first edge and disposed over the ramped edge of the slot. The reed is adjustably attached on both short edges to adjust the amount of slack in the reed for tuning purposes.

BRIEF DESCRIPTION OF THE DRAWINGS

FIG. 11A-11C relate to a variation on the vertical motion embodiments in which the vertical motion is achieved by squeezing a flexible tube 26 in which the top portion 1 and bottom portion 5 are inserted. FIG. 11B is a perspective view of the top portion and FIG. 11C a perspective view of the bottom portion. It should be noted that the figures depict a preferred form in which the top and bottom portions are rounded to better fit inside a cylindrical tube. Also note that the figure depicts a preferred form in which the V-shaped groove 7 *i* of the embodiments of FIGS. 1-8 is truncated or omitted. Also, in this preferred form, the spring 8 and spring recess 18 are omitted.

FIGS. 12A and 12B relate to an embodiments in which the tongue is used in place of the top portion of the embodiments of FIGS. 1-8, and the bottom portion is inverted so the reed 14 rests on the tongue. FIG. 12B is a profile schematic view of the portion 30 held in the mouth 27. The gap between the tongue and the device is for the sake of clarity; the tongue 28 would actually be pressed against the reed 14, thus pressing the top of the portion 30 against the palate (roof of the mouth) 29. The airflow is from the windpipe, through the back of the mouth, across the "floor" (now a ceiling as a result of the inversion) 13 of the throat at the mouthpiece end, across the reed 14, and out the front of the mouth.

DETAILED DESCRIPTION OF THE PREFERRED EMBODIMENTS OF THE INVENTION

Figure 1:
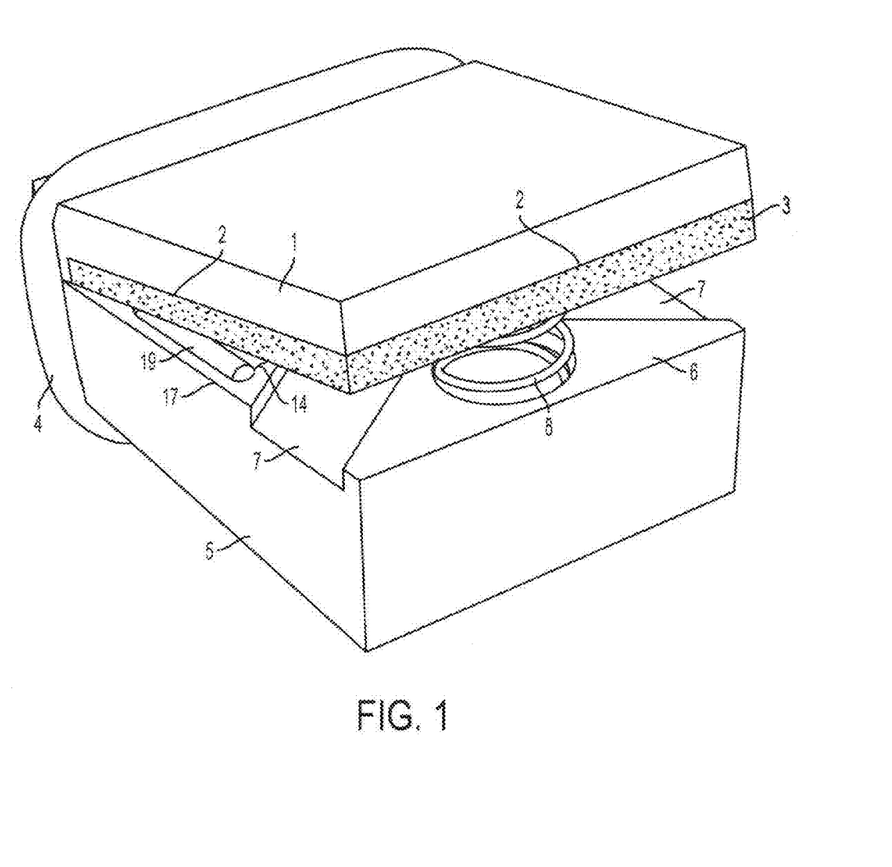
FIG. 1 shows a perspective view of a hinged call.

FIGS. 1-8 all relate to hinged embodiments of the call but many of the features apply mutatis mutandis to other embodiments, as discussed below. FIG. 1 shows a perspective view of a hinged embodiment of the call, the call being in the open position. The figure depicts the top portion 1 with inside facing surface 2 (only the edges of which are visible in this figure), which features a recess in which the closed cell foam lining 3 sits. This is pivotably connected by pivoting means 4 to the bottom portion 5, which has inside facing surface 6. A V-shaped (as viewed from above) groove 7 is disposed in this surface. The free ends of the top and bottom portions may be brought together by pressure, thus bringing the call toward or into the closed position, but this is resisted by spring 8 disposed between the top and bottom portions. One of the lateral reed securing pins 19 and a sliver of the reed 14 are also visible.

Figure 2:
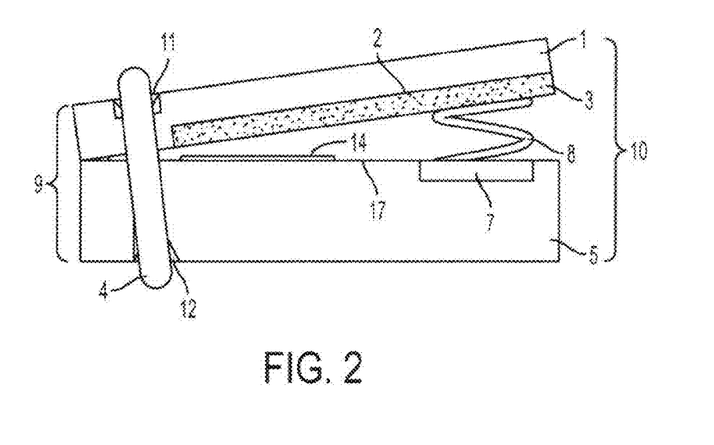
FIG. 2 shows a profile view of a hinged call.

FIG. 2 shows a profile view of the same embodiment. The call is again in the open position. In this view, one may see more clearly the front (mouthpiece end) 9 and the rear (spring end) 10 of the two portions. It is also apparent that in this embodiment, the pivoting means 4 takes the form of an elastic band sitting in top portion notch 11 and bottom portion notches 12. In this figure, the bottom portion notching takes the form of two side notches but alternatively or additionally there could be a notch on the underside of the bottom portion. Likewise, while the figure depicts a single notch on the top side of the top portion, there could alternatively or additionally be two side notches on the top portion.

Figure 3:
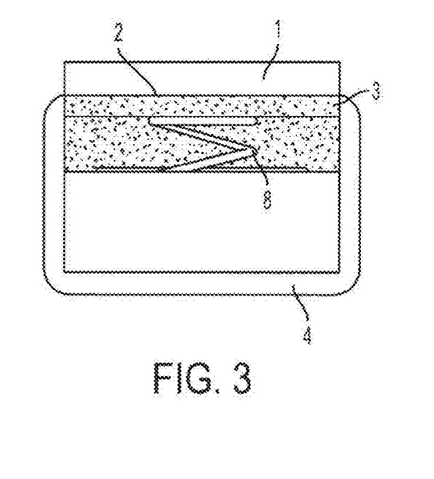
FIG. 3 shows a rear (distal end) view of a hinged call.

FIG. 3 shows a rear (distal end) view of the distal end 10 of the call, in the closed position. Note that the spring 8 compresses the lining 3 at its points of contact.

Figure 4:
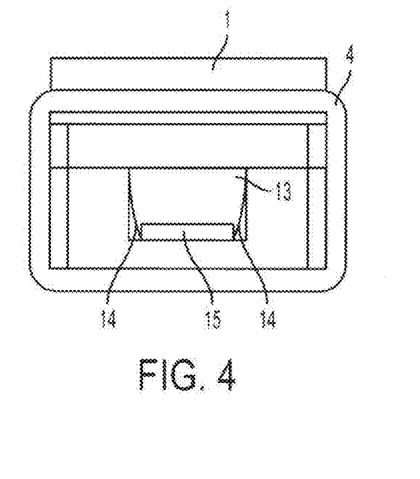
FIG. 4 shows a front (mouthpiece end) view of a hinged call.

FIG. 4 shows a front (mouthpiece end) view of the call, in the closed position. At this end one can see the throat 13, which is the chamber containing the reed 14 (only the edge of the reed is visible, and it is partially hidden behind frontal reed securing pin 15. The user will blow through the throat, toward and over the reed.

Figure 5:
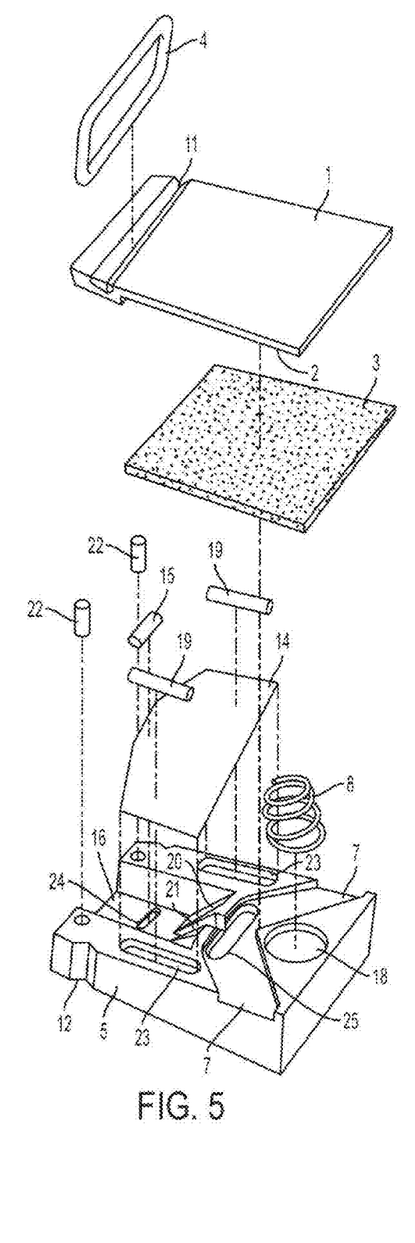
FIGS. 5 and 6 show exploded perspective views of a hinged call in which a single reed is provided.

FIG. 5 shows an exploded perspective view of the caller. The spring 8 sits in recess 18 in the inward-facing surface 17 of bottom portion 7. In this view, one can see that the reed 14 is retained in position across the top of the throat (chamber) 13 by the frontal reed securing pin 15 and the lateral reed securing pins 19. The former fits into pin slot 24 and the latter fit into pin slots 23. The floor of the throat is depicted as 16. A ramp 20 rises from the floor in the direction of the reed 14, i.e., toward the rear (moving end) of the call. A slot 21 is disposed in the center of the ramp, running from front to rear thereof. Pins 22 help secure the top portion to the bottom portion at the mouthpiece end.

Figure 6:
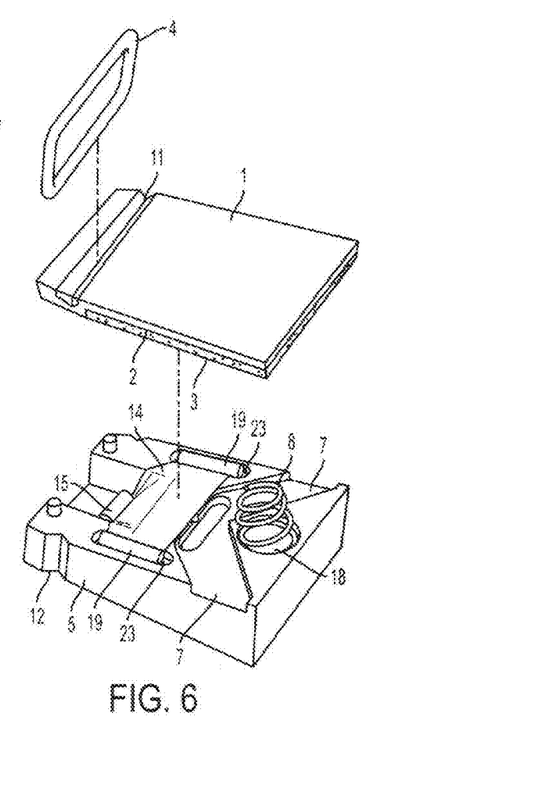

FIG. 6 is a partially exploded view with the reed secured and the spring 8 seated in recess 18.

Figure 7:
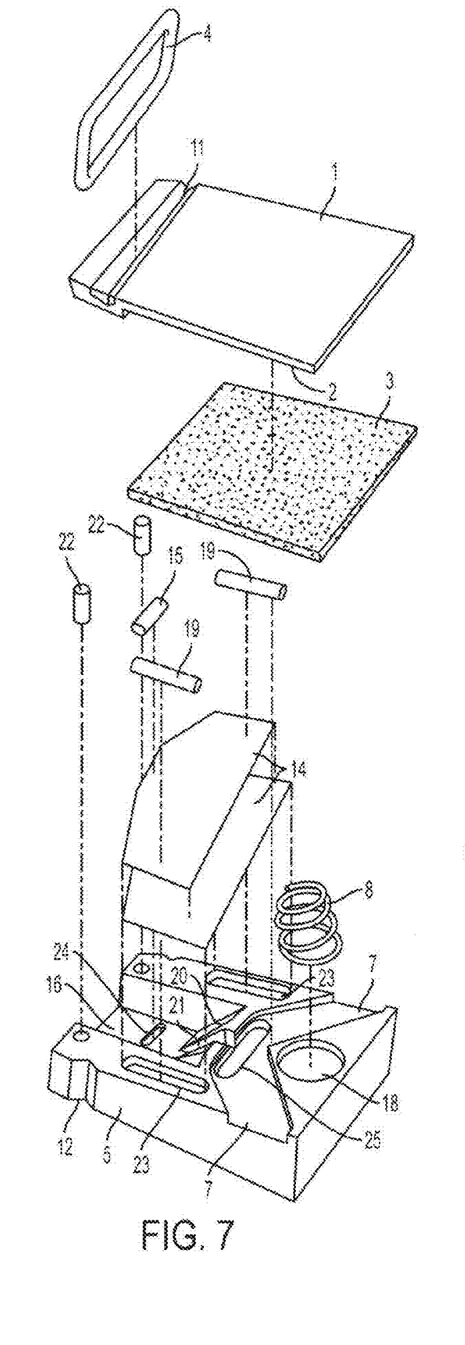
FIGS. 7 and 8 show exploded perspective views of a hinged call in which two reeds are provided.
Figure 8:
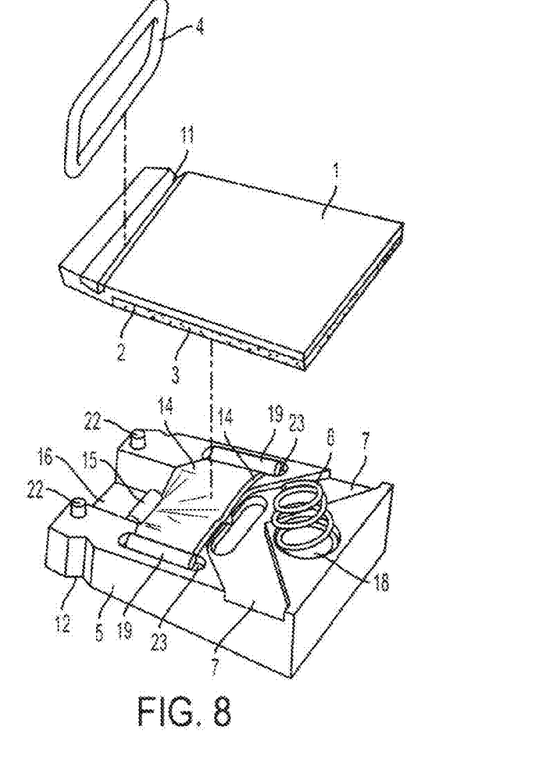

FIGS. 7 and 8 are analogous to FIGS. 5 and 6, but they depict a double reed, rather than the single reed of FIGS. 5-6.

Overall dimensions. The device should be large enough to generate an adequate volume of sound, and small enough for convenient handling. The device can be made in different sizes, with a maximum dimension of from about one to about six inches, however, for ease in carrying multiple calls, e.g., on a string worn around the neck, 1.5 inches in length is preferred. Preferably, the device in the closed position has a length (from mouthpiece end to opening end) of about 1.5 inches and a width of about 1.25 inches.

The preferred individual part dimensions set forth below are in particular for a device of the preferred overall dimensions. If a larger device is used, the individual part dimensions may be kept substantially the same, increased proportionally, or somewhere in-between. The aspect ratio (overall length:overall width) is preferably kept the same but may be altered. Preferably the overall length is not more than twice the overall width. The change in some individual part dimensions may influence the sound but a compensatory change may be made in other individual part dimensions if desired.

Top portion. The top portion 1 may be made of any rigid material that can be given the appropriate shape, including metal, rubber, plastic (e.g., acrylic) or wood, and preferably is made of wood. It preferably has a thickness of about 0.25 inches. The foam lining 3 may be any foam that is suitably compressible; the purpose of the foam lining 3 is to simulate the acoustic effect of the spongy tissue in the voice box of the animal, e.g., elk. It should be able to return to its original shape even after frequent compressions. A closed cell foam is preferred because with open cell, there could be some airflow through the foam that might adversely alter the sound. Any compressible closed cell foam, rubber or plastic, may be used. Such materials include polyurethane, polyethylene and polystyrene plastics, as well as neoprene and natural latex foam rubbers. However, polyethylene is particularly preferred. Polyethylene, cross-linked polyethylene and neoprene have been found to be similar in performance, but polyethylene is the cheapest.

The thickness of the lining 3 should be enough to provide the desired acoustic effect but not so thick as to make it difficult to work the call. A thickness of even an inch is still manageable. An uncompressed thickness in the range of about $1/16^{th}$ to $1/8^{th}$ inch is preferred, and one of about $1/8^{th}$ inch is especially preferred. The dimensions of the recess in the inward-facing (i.e., bottom portion-facing) surface 2 of the upper portion 1 should be sufficient to accommodate the lining. The thickness of the lining may be a little greater than the thickness of the recess, in which case the compression of the foam lining when the call is closed will provide an additional elastic resistance.

In some embodiments, the foam lining 3 is of uniform thickness. In other embodiments, the thickness is non-uniform. For example, the foam may be wedge-shaped in profile when in a non-compressed state, i.e., thinner at the mouthpiece end and thicker at the distal end. If the device has a rocker embodiment (other embodiments are described later in this specification) then for a given pivot angle, if the foam thickness is uniform, the compression is greatest at the end closest to the hinge (which is at the mouthpiece end) and least at the end furthest away. If this uniform thickness (i.e., rectangular profile) is replaced with one providing a wedge-shaped profile, then this increases the degree of compression of the foam at the distal end for a given pivot angle.

Figure 9A:
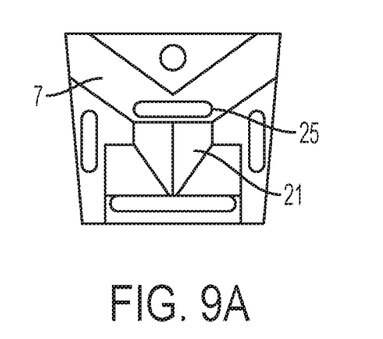
FIG. 9A shows an overhead view of an embodiment of the bottom portion 5 in which the slot 21 widens as it rises.
Figure 9B:
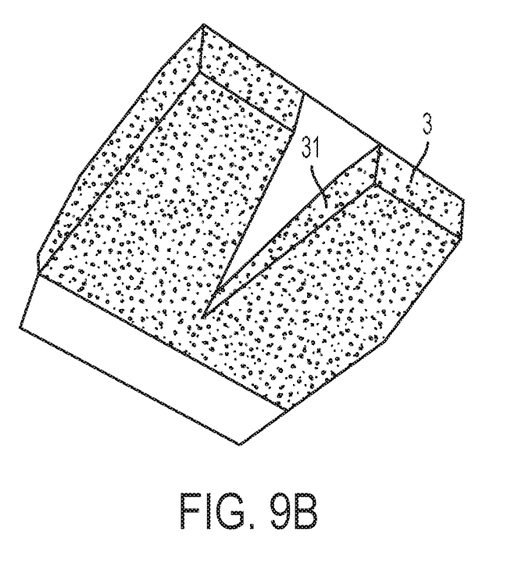
FIG. 9B shows a perspective view from below of an embodiment of the top portion 1 in which there is a triangular groove or cutout 31 in the foam 3.

In other embodiments, there is a groove in the foam, see FIG. 9B. The depth of the groove may correspond to the full thickness of the surrounding foam (i.e., it is a complete cutout) or to some lesser thickness. Preferably, the group is a substantially triangular-shaped groove or cutout in the foam wherein the triangle is preferably an isosceles triangle with two long sides and one short side, and wherein the short side is parallel to (faces) the mouthpiece end and thus perpendicular to the direction of air flow. Preferably, if the overall device has its preferred dimensions, the lateral width of the groove at the mouth end is about ¼ to ⅜ inch, more preferably ⁵⁄₁₆ inch, and the length from the mouth end of the groove to the opposing vertex is about 1 to 1⅛ inch, more preferably 1¹⁄₁₆ inch.

Bottom portion. The bottom portion 5 may be made of metal, rubber, plastic or wood, and preferably is wood. It preferably has a thickness of about ⁷⁄₁₆ths of an inch. The bottom portion may be characterized as having a top portion- or inward facing surface (the "plateau") with various recesses, e.g., throat 13. The bottom portion may be produced in any cost-effective manner, including but not limited to injection molding or casting it to the desired shape, or carving the recess elements into a rectangular block.

At the mouthpiece end 9, the bottom portion 5 features a throat 13, essentially the chamber that the user blows into. The throat is preferably formed by a modified (see below) slot in the inward-facing surface of the bottom portion, whose longest dimension is in the front-to-rear direction, i.e., from mouthpiece end to distal end.

The throat 13 has an open ceiling and is roughly rectangular in plan and frontal view, but its floor 16, while horizontal at the mouthpiece end, slopes upward (ramp 20) toward (horizontally) the distal end (vertically) the underside of the reed 14. Preferably the width of the ramp is the same as the width of the throat.

Preferably, the throat 13 has a width of about 0.5 inches at the floor of the throat at the mouthpiece end 9. A wider throat deepens the pitch and a narrower one increases it. The side walls of the throat may be vertical or may slope outward slightly. Preferably, the height of the throat at the mouthpiece end is about 0.25 inches.

The ramp 20 preferably begins about 0.375 inches from the mouthpiece end, and rises in the direction of the distal end, preferably at an angle of 30-60 degrees, more preferably about 45 degrees. Thus, it may have a run of about 0.25 inch and a rise of about 0.25 inch. Note that the rise is about equal to the height of the throat. A shallower ramp gives a higher pitch. If the ramp is too steep, the device will not function as well.

The ramp 20 contains at least one slot 21 running with the ramp toward the distal end and up toward the reed 14. This slot, preferably a single central slot, helps to start the vibration of the reed. It may have any of a variety of cross-sections, including V-shaped, rectangular, pentagonal (essentially a rectangle with a V-shaped floor) or U-shaped, preferably V-shaped in cross-section. The floor of the V is sloped up toward the distal end, but preferably at a shallower angle than the ramp 20. It may be of constant or increasing width as it rises; an increasing width form is depicted in FIG. 9A. The slot begins at the base of the ramp but continues beyond the top of the ramp, and its width at the top is preferably about ⁵⁄₁₆$^{th}$ of an inch. The depth of the slot is preferably about ³⁄₃₂ of an inch at the top of the ramp, and about equal to the height of the throat at the bottom of the ramp.

One purpose of the slot 21 in the ramp 20 is to provide a route for air to escape when the device is in the closed position, and for that purpose it need not be in the center, although the central position is probably the most efficient. Moreover, rather than provide a single slot, one may have two, three or more slots, but it does not appear that they provide any substantial advantage over a single slot and they add to the cost of manufacture. Hence, while permissible, the multiple slot-in-ramp embodiments are not preferred.

The central slot 21 extends beyond the ramp and throat, cutting across the bottom portion. This portion of the central slot 21 is preferably about 0.125 inches in length. This extension creates two "wings" on either side of the slot, with three sides of each wing defined by the top of the ramp, the edge of the slot extending beyond the ramp, and the leading edge of the V-shaped groove 7, and the fourth side being the projection of the top edge of the side of the throat.

Reed. The call may be equipped with one or more reeds. If there is more than one reed, then preferably there are two or three reeds. The reed 14 is preferably approximately rectangular in shape (e.g., the six-sided shape that is a combination of a trapezoidal shape at the mouthpiece and a rectangular shape at the distal end, as depicted in FIG. 5), and thus has two short edges and two long edges. The reed is a flexible piece of material capable of vibrating to create sound, and it catches air like a sail. It may be made of any suitable vibratable material, but nitrile rubber is preferred. Natural rubber may also be used, with the caveat that some people are allergic to it. Preferably, the reed is about 0.001 inches thick.

The front of the reed 14 may rest on the floor 16 of the throat 13, secured there by the frontal securing means 15, as shown in FIG. 6. From there the reed runs front-to-back over the ramp 20 and its slot 21. The reed is thus bent; being sloped over the ramp and essentially horizontal distal to the ramp (with possibly an indentation where it lies over the slot 21). Consequently, when the device is in the closed position, the foam is essentially flat against the reed.

The reed may be a continuous surface or it may be cut or perforated to alter the sound production. For example, it may be given a sawtooth trailing edge, with preferably the V of the sawtooth having a depth of about ⅛ inch and a width of about ⅛ inch. But other geometric shapes are possible.

If more than one reed is provided, they may be disposed in any of a variety of ways, including: stacked vertically with one directly over the next; stacked vertically with partial horizontal overlap, or unstacked (forming parallel rows across the airflow). If stacked vertically with partial overlap, either the leading (mouthpiece end) may be exposed, or the trailing (distal end) may be exposed. Preferably, they are stacked vertically with partial overlap, with the leading ends exposed. The user may adjust the degree of overlap by temporarily removing the pins, moving the reeds, and reinserting the pins.

Moreover, the reeds may be of different lengths (in the airflow direction), in which case when stacked vertically they may be stacked to align their leading edge, their trailing edge, or their centers. They may even be of different widths, but of course they must be wide enough to bridge the throat. The reed securing means are of course adapted to the number, size and arrangement of the reeds.

When air is blown into the throat from the mouthpiece end 9, it flows over the reed 14, which vibrates at a high rate, at least in some device positions against the foam. For the proper sound, it is preferable that the reed be slightly loose, not stretched. A double or triple reed makes for a call that may sound like it is being made by multiple animals, e.g., elk, and may have further advantages in duplicated the complex vocalization of even a single animal.

The reed 14 is secured by any suitable means, such as adhesive tape, glue, pins, or combinations thereof. These means are preferably removable so that the amount of slack in the reed can be adjusted, or the reed replaced, if need be. In a preferred embodiment, these take the form of at least two lateral securing means and one at least one frontal securing means. More preferably, these securing means are slot-and-pin mechanisms; the reed material is pushed inside the slot and the pin is forced over the reed to pinch the reed material between the pin and the wall of the slot.

If there are multiple reeds, and the reeds are vertically stacked, then instead of having a single pin in each slot 23, we may use several pins, one for each reed, with reed and pin alternating in the same slot. Preferably, these pins are narrower than those that would be used to hold a single reed. If the reeds are disposed unstacked in non-overlapping rows, or vertically stacked but with partial overlap, then one may secure them all laterally with a single pair of long slots, or provide several pairs of shorter slots.

Preferably, the rear (relative to the mouthpiece) of the reed is first secured by two or more upper (lateral) securing means, which is preferably on the inward-facing surface of the bottom means, and then the front (relative to the mouthpiece) of the reed is secured by the front securing means, which is preferably on the floor of the throat chamber. The degree of tension in the reed may vary as between the horizontal and sloped portions.

There may be more than one pair of lateral securing means, and, if so, they may be either one behind the other or one further out than the other configuration. Likewise there may be more than one frontal securing means, either one behind the other or on either side of the centerline of the device. Additional securing means may facilitate changing the placement of the reed, replacing the reed with one of a different width or length, or presenting additional reeds.

Preferably the portion of the reed 14 that is exposed when the top portion is removed, i.e., is not under the securing means and is thus free to vibrate, is about 0.5 inches in length (parallel to airflow) and 1.875 inches in width (perpendicular to airflow).

The rear of the throat 13 communicates through the central slot 21 with the V-shaped groove 7 disposed in the inward-facing surface of the bottom portion. At the foot of the central slot 21 is optionally the lateral slot 25, which is essentially perpendicular to the central slot 21 and lies in the floor of the V-shaped groove 7 (and thus is deeper than 7). The lateral slot 25, if provided, is preferably about 0.5 inches long (in the lateral direction, i.e., perpendicular to the line from the mouthpiece end 9 to the distal end) and 0.125 inches wide, and the floor of the lateral slot is roughly at the same height as the floor of the central slot 21 at the end nearest the distal end of the device, i.e., where it meets the V-shaped groove 7.

Preferably, means are provided so that air can escape from the device even when it is blown in its fully closed position. In a preferred embodiment, this is a V-shaped groove. The V-shaped (in plan) groove 7 provides two channels by which air and thus the sound exits the caller, and these channels are believed to create an echoing effect that enhances the realism of the call. The V-shaped groove also acts to protect the foam 3. The grooves preferably open out to the sides of the device, close to the distal end. Conceivably, one of the two channels could be omitted. If the centrally located single spring 8 were replaced with two smaller springs at the distal corners of the device, then a simple, linear channel running from the reed to the rear edge of the bottom portion would suffice.

The groove 7 is preferably about $1/16^{th}$ inch deep, and preferably about $5/16^{th}$ inch wide (measured perpendicularly to the wall of the groove). The angle of the V is preferably about 90 to about 110 degrees.

The V-shape groove 7 is preferably truncated on the wall closer to the mouthpiece end, and there communicates through central slot 21 with the throat 13.

The length of the device from the mouthpiece end 9 of the throat to the top of the ramp is preferably about $5/8^{th}$ inch. The length of the device from the mouthpiece end of the throat to the far end of the central slot 21 is preferably about $7/8^{th}$ inch. That is also approximately where the V-shape groove is truncated.

The purpose of the optional lateral slot 25 is to provide an additional reservoir for the air blown across the reed and thus reduce back-pressure when the device is in the closed position.

In one series of embodiments, at the mouthpiece end, there is a pivotable connection 4 between the upper and lower portions. This may take any conventional form, but it is desirable that it readily able to be dissembled so that the reed slackness may be adjusted. Thus, in the preferred embodiment, it is a combination of (1) a rubber band engaging notches on the outside of the top and bottom portions, near but not at the mouthpiece end, and (2) pins fixed in the lower portion and facing upward, and engaging holes in the inward-facing surface of the upper portion, said holes and pins being closer to the mouthpiece end than said rubber band and notches.

Thus, in this preferred embodiment, the axis of pivot is the front (mouthpiece end) lower edge of the top (pivoting) portion 1, as can be seen in FIG. 2. The optional band 12 and pins keep the top portion 1 from sliding relative to the bottom portion 5, or separating from the bottom portion 5, as the device is opened (the top portion pivoted about said axis), and the spring 8 constrains the degree to which the top portion is pivoted.

Alternatively, the top portion 1 and the bottom portion 2 may be pivotably connected by spindle means attached to the bottom portion and engaged by spindle engagement means attached to the top portion. And any other conventional pivotable connection means may be employed.

If the top portion 1 were shorter than the bottom portion (in the airflow direction), then the axis could be displaced from the mouthpiece end accordingly. Nonetheless, the axis of the pivotable connection should be closer to the mouthpiece end 9 than is the beginning of the ramp 20 and more preferably is essentially at the mouthpiece end, as in the preferred embodiment described above.

The spring 8 may be of any material typically used to form springs, and is preferably metal. It is preferably of the coil type and may be cylindrical or conical in profile. The spring is preferably a compression spring, biasing the device to an open position when relaxed (no pressure applied by the user). The choice of spring dimensions is not critical as the spring merely serves to provide some resistance to closing the device, thus making it easier to control the pitch by controlling the angle (pivot angle or pitch control angle) of the inward facing surface of the top portion to the inward facing surface of the bottom portion. By way of example and not limitation, the spring could have a maximum outer diameter of about 0.3 inch, a solid length of about 1/8 inch, and a free (uncompressed) length of about 0.4-0.5 inches, and be formed of a steel wire with a diameter of 0.03 inches. If the device has a length of about 1.5 inches, the center of the spring may be situated about 1.25 inches from the mouthpiece end. The depth of the recess 18 in which the spring sits may be about 1/8 inch.

The open (relaxed) pivot angle (the angle between the inward facing surfaces of the top and bottom portion when the device is relaxed) is dependent on the horizontal distance from the pivot axis to the point of attachment of the spring 8, the maximum length of the spring in normal usage (which in turn is dependent on the elastic force exerted by the spring as it is stretched), and the depth of the recess 18 in which the spring is situated. Note that the spring at its solid (compressed) length may extend above the top of the recess, and the device still be operable so that sufficient pressure brings it to a fully closed position, because the foam is compressible. How much extension is permissible is dependent on the compressibility and thickness of the foam.

Preferably, the spring is chosen such that in the open (relaxed) position, the angle of the top portion to the bottom portion is 5-20 degrees, more preferably about 10 degrees.

Pressure may be applied at the distal end of the device to the upper and/or lower portion in order to reduce the angle that the upper portion makes with the lower portion. This applies a compression load to the spring, which the spring resists. It also reduces the distance between the reed and the foam, most pronouncedly at the opening end. The pressure may be applied by hand, or by putting the device in one's mouth and biting down on it. The advantage of the device being small enough to fit in the mouth and be modulated by biting it that it leaves both of the user's hands free. Depending on the amount of pressure applied, the device may assume any of a series of partially open positions, or a closed position, the latter being when the pivot angle is essentially zero.

As the pressure is increasingly applied, closing the gap between the upper and lower portions at the distal end, the pitch produced as air is blown into the throat at the mouthpiece end is increased.

As the spring is compressed (device closed) while blowing air into the call, the foam seals against the sides on the outside of the reed. As air is then forced in the channel created by this compression the foam begins to contact the reed towards the mouth. And as the compression is continued the foam eventually becomes flat against the reed. The air speeds up and the looser portion of the reed that is disconnected from the call rapidly vibrates against the foam creating the range in pitch. So by compressing the call just slightly, a low pitched sound is made and by compressing the call to a point where air flow is nearly cutoff by the foam's pressure against the reed as it sits in the grooved channel a high pitch is created. And the opening or closing thus plays a sliding note on a scale that is related to how much air is allowed to pass and how close the foam is to the open end of the reed. The reed vibrating against the foam in the grooved air channel gives it desirable acoustic characteristics. The distance the hinged action puts the foam from that vibrating end of the reed changes the distance it can move up and down and the speed it can vibrate hence there is a controlled variable in the sound.

The device preferably can open at least slightly beyond the point at which the foam ceases to touch the reed. Opening past that point allows the sound to abruptly cut off if that is part of the vocalization one intends to imitate. However, preferably the spring is cut to a length that keeps the device from opening much further than that point.

Note that the foam lining is compressed only against that portion of the reed that lies on the horizontal plane defined by the inward facing surface of the bottom portion of the device, and not the portion that lies below that horizontal plane, on the ramp of the throat chamber.

It will be appreciated that the reed is vibrating inside a resonant chamber which comprises the wedge-shaped volume formed by the top portion 1 and bottom portion 4 when the device is in an open position—a volume which varies in shape and size according to the degree to which the device is opened—and a fixed volume formed by the throat 13 and the V-shaped (in plan) groove 7, which are both open on top.

Consideration should be given to how the vibratable area of the reed changes as the device in the hinged series of embodiments is moved from the fully open to the fully closed orientation. Initially, the vibratable surface area is defined by the combination of the physical edges of the reed and the places where the reed is clamped by the frontal and lateral securing means. As the top portion is pivoted downward, there is a line or zone of clamping exerted by the compressible foam that advances from the hinge end (which is also the mouthpiece end) toward the distal end. The precise location where the additional clamping is manifest will be dependent on the tautness of the reed and how it is draped over the ramp region (see FIG. 6 for one possibility), as the clamping occurs only when the foam presses against the reed and this cannot occur in places where the top of reed is significantly below the upper surface of the bottom portion. Also, the effect on the vibration may depend on whether there is space below the reed or not (there would be space, for example, where the reed is over the throat, but not in the areas between the lateral securing slots and the top side edges of the throat where the reed is over the top surface of the bottom portion. Even where the reed is over the throat, the ramp may affect the vibration. Thus, the progressive closing of the hinged device changes the effective vibratable area of the reed and increases the pitch produced.

The clamping effect of closing the hinged device becomes most pronounced when the effective line or zone of clamping reaches the aforementioned "wings", as those constrain the downward movement of the reed. The progressive clamping caused by the hinged motion causing the foam to press against the reed where it is constrained by the upper surface (particularly, between the lateral slots and the edge of the throat, and the "wings" flanking the central slot 21 beyond the top of the ramp) contributes to the ability of the device to play a realistic sliding note, either up (by closing the device) or down (by opening the device) the scale.

Preferably, the foam only seals against the reed without substantially deflecting it downward.

The identification of top and bottom is arbitrary. The call will function equally well upside down, or turned sidewise.

The well-known sounds made by a cow or bull elk, or by elk calves, are referred to herein as natural elk calls. While each elk may have a unique call, they have common characteristics which are well known to hunters and designers of elk calls. Moreover, recordings of elk vocalizations are readily available to the public.

The tuning in the field of the present invention and the optimization of the parameters of this call during design and manufacture are often done by careful listening to the sound produced by an individual familiar with these natural elk calls. While it is possible to use sophisticated electronic sound measuring equipment, it is believed that the present invention may be readily manufactured without such equipment, if an individual who is familiar with such natural elk calls assists in the process.

It will be appreciated by the skilled worker in the art that the dimensions and materials of the device may be varied, so long as it does not substantially impair the functionality of the device. For example, we have made the device and the reed wider by 0.4 inches, while maintaining a 45 degree ramp angle; making this change deepened the pitch. Changing the length alone also deepens the pitch (and reduces the ramp angle to less than 45 degrees). We have also made the device both wider and longer by 0.4 inches and this has been found to helpful in simulating the slower pace (relative to an elk) of a whitetail deer's vibrations.

Unless otherwise expressly taught, the term "about" as used to qualify a numeric value generally connotes that a 20% variation is acceptable, i.e., the term "about X" would encompass 80% X to 120% X. The usage "about X" will further connote that in a preferred embodiment, the value will be in the range of 90% to 110% X.

La Montagne positions the reed inside the tubular mouthpiece chamber whereas in applicant's device it is on the ramp in the throat chamber. These are structurally and functionally distinct. La Montagne's tubular mouthpiece chamber is open only at the ends. In contrast, in applicant's device the throat chamber is open also at the top of the throat chamber and thus in more intimate communication with the outer, roughly wedge-shaped variable volume chamber formed by the top and bottom portions when the device is in an open configuration. This is the case because the pivotable connection between the top and bottom portions is at the mouthpiece end in applicant's device, whereas it is further downstream in La Montagne's noisemaker. The result of this arrangement is that the "hinging" (opening and closing by virtue of the pivotable connection) action of the call cause the reed to vibrate less or more depending on that action. In La Montagne's device, the opening or closing of the noisemaker does not affect the airflow over the reed. Consequently, it is not likely to produce rises and falls in pitch. Also, La Montagne's reed is bent at a right angle whereas applicant's reed is bent at an obtuse angle. And it appears that the bends in La Montagne's reed merely relate to how it is secured inside the tube; the air is blown over a flat portion. In contrast, in our device the air passes over a bend in the reed.

Halsten does not teach a ramp as contemplated by applicant. Applicant's entry structure is the throat chamber. The ramp is within the throat chamber, near the mouthpiece end. Halsten's entry structure is the tapering bore, which is conical in shape. A ramp is essentially a structure that provides an inclined plane; it is the projection of a right triangle. A tapering bore not only has a rising floor, like applicant's ramp, it also has a falling ceiling and closing walls. Hence it is not equivalent to a ramp.

Halsten's reed is never in contact with the floor of either his tapering bore or his cylindrical bore, being suspended above it. In contrast, Applicant's reed is draped over the ramp portion and at least a portion of an inward-facing surface of the bottom portion of applicant's device. Halsten's device does not appear to be tunable by the ordinary manipulation of the device, and it does not appear to be capable of producing rises or falls in pitch.

La Montagne and Halsten do not teach providing a soft foam surface to modify the acoustics of the call, let alone tuning such modification by opening or closing the device. When the applicant's device is in the closed position, the foam lining is tightly compressed against the reed. As the device is gradually opened, the degree of compression is reduced, and there is a degree of opening at which the foam lining is no longer in contact with the reed. These various degrees of compression affect the vibration of the reed. To put it another way, the reed vibrates against the foam with variable pressure.

The preferred elk call embodiment described above may also be used to imitate distressed rabbits and fauns.

Applicant's device may also be used as a turkey call. In the preferred turkey call embodiment, three reeds are used, and the lateral securing means for the reeds comprise three pairs of pins that are slimmer than those used in the preferred elk call. There is also preferably a groove in the foam as shown in FIG. 9B. The long dimension of this groove is along the centerline of the device and parallel to the direction of airflow when air is blown through the device. This groove permits some air to pass through so that the reed vibrates against the foam only at higher volumes of air. This means that the sound can be cut off abruptly to better simulate the vocalization of the turkey.

A hinged structure is not the only way that the foam may be compressed against the reed in order to modulate the sound produced.

Thus, in another embodiment the upper portion (lid), rather than being rotated around a hinge (in which case there is no vertical movement at the hinged side, maximum vertical movement at the opposite (spring) side, and an intermediate amount of vertical movement in-between) the device may be designed so that the upper portion is simply moved (translated) vertically toward or away from the lower portion, with the inward facing surfaces remaining parallel to each other.

As in the hinged embodiment, one or more springs may be used to control the movement of the upper portion relative to the bottom portion, the operator's teeth or fingers urging them together and the springs resisting this motion, and thus the compression and relaxation of the foam.

Figure 10:
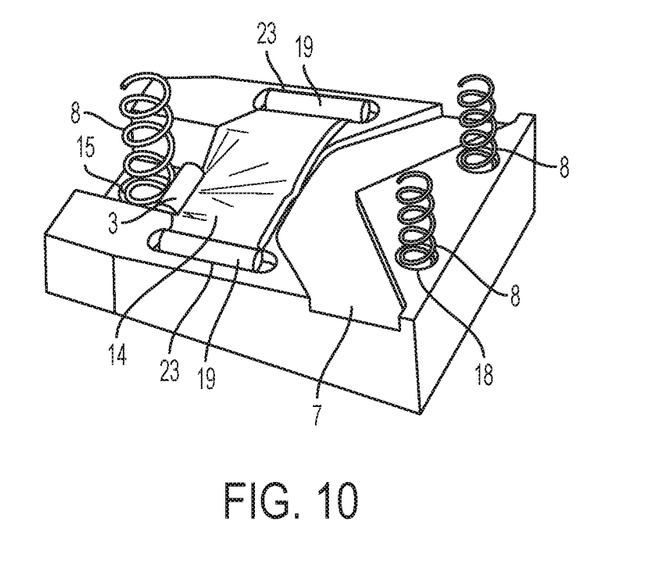
FIG. 10 shows a perspective view of an embodiment of the bottom portion 5 for use in an embodiment in which the top and bottom portions move together and apart vertically rather than the top portion pivoting against the bottom portion as in the hinged embodiments. The depicted embodiment has three springs.

In one sub-embodiment, a pair of springs are placed essentially on the sides of the device, essentially midway between the mouthpiece end and the distal end. In another-sub-embodiment, there is a spring at each corner of the device, each spring connecting one corner of the lower portion to the corresponding corner of the upper portion. In still another sub-embodiment (see FIG. 10), there are three springs, one on the floor 16 of the throat 13, and the other two at the distal end corners.

One or more elastic bands 4 may be used to hold the top portion 1 and the bottom portion 5 together. These are similar to the band preferably used to establish the pivotable connection for the hinged embodiments. As in those embodiments, each band may engage a notch 11 in the top portion and/or a notch 12 in the bottom portion. In one sub-embodiment, there is a single band 4, and it engages notches at the center of the top and bottom portions. In a second sub-embodiment, there are two bands, and they engage notches near the mouthpiece end 9 and distal end 10.

In the hinged or vertical motion embodiments, rather than (or in addition to) providing a conventional coil spring 8, the compressible foam may be chosen to act as a spring, i.e., the foam material and thickness chosen so as to provide a sufficient restoring force to return the device to the fully open position when the operator releases pressure on the top and bottom portions.

Figure 11A:
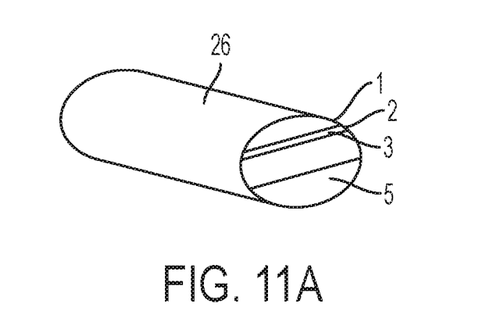
FIG. 11A is a schematic perspective view showing how the top and bottom portions fit into the tube.
Figure 11B:
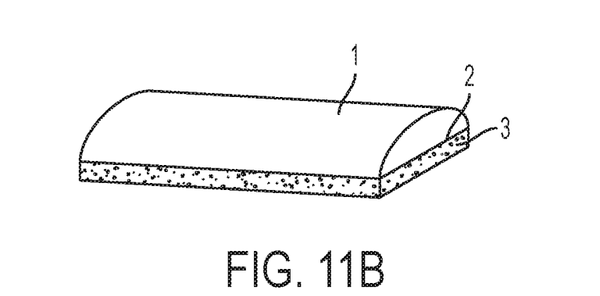
Figure 11C:
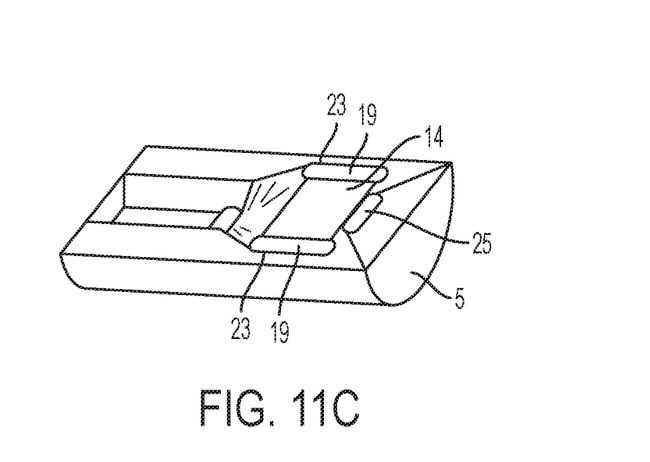

In the vertical motion embodiment, rather than providing a spring, the upper and lower portions may be disposed inside a flexible tube 26, as shown in FIGS. 11A-11C. Squeezing the top and bottom of the tube forces the two portions together, bringing the foam into contact with the upper surface of the bottom portion of the device.

Figure 12A:
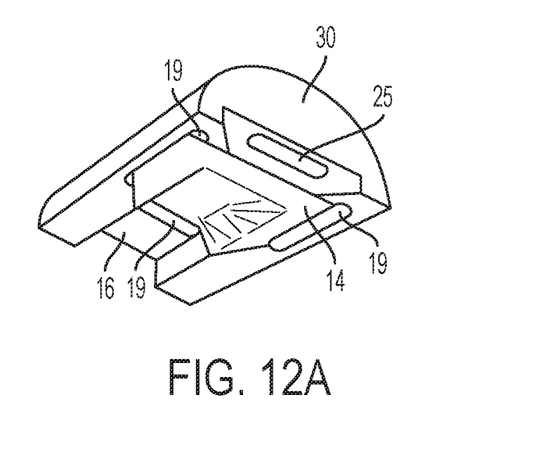
FIG. 12A shows this reed-mounting portion 30 (the inverted bottom portion of the earlier embodiments). As depicted, the distal end terminates with the air reservoir 25, as in the case of FIG. 11C.
Figure 12B:
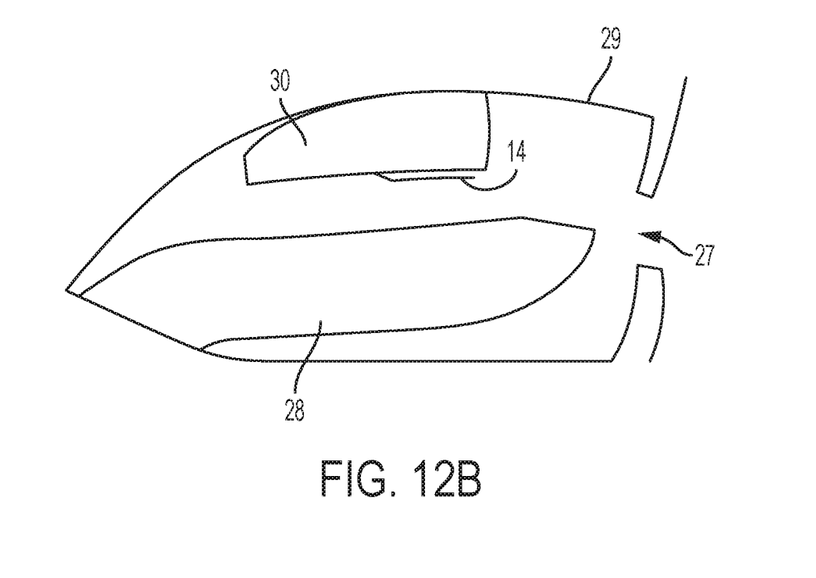

In another embodiment, depicted in FIGS. 12A and 12B, the device is turned upside-down and the top portion (i.e., the lid and compressible foam) are replaced by the operator's tongue. For sake of clarity, this embodiment is referred to as the "half" call, since it retains only one half (the bottom portion) of the prior embodiment. Also, the portion that corresponds to the inverted bottom portion of the earlier embodiments shall be referred to herein as the reed-mounting portion 30, and, like the bottom portion of the hinged and vertical embodiments, comprises the throat, the ramp within the throat, the reed securing means, and preferably also means for the escape of air, e.g., the at least one slot 21 within the ramp and the channel, and more preferably also the reservoir 25. Retention of the V-shaped channel 7 is not necessary and omitting it shortens the device. Upward pressure with the tongue, pressing the device against the palate, has the same effect as closing pressure on the hinged or vertical embodiment, in the sense that it tends to seal the tongue against the reed, like closing pressure on the earlier embodiments sealed the compressible foam of the upper portion against the reed mounted on the bottom portion. However, the tongue 28 and the reed-mounting portion do not move together and apart, but rather are pressed against each other when the tongue presses the portion 30 against the palate 29. Because of the action of the tongue 28, the coil spring 8 is superfluous.

A disadvantage of the vertical motion embodiments relative to the hinged motion embodiments is that if the foam thickness is uniform, the pressure of the foam on the reed will be uniform, dependent only on the distance between the top portion 1 and the bottom portion 5. In contrast, with the hinged motion embodiments, there was a pressure gradient, with the pressure greatest at the leading edge (nearest the mouthpiece end) of the reed 14, because with a hinge at the mouthpiece end, the top and bottom portions were closest at that end and furthest apart at the distal ends. The effect was further modulated by the relief of the inward-facing surface of the bottom portion 5, as that relief determined where there was and wasn't space underneath the reed. Notably, the disposition of the slot or slots 21 beyond the top of the ramp 20 created areas we called "wings" that were important in the clamping of the reed at certain stages in the closing of the hinged device.

This disadvantage could be addressed, as previously disclosed, by use of a foam of wedge-shaped cross section, thickest at the mouthpiece end, so as to restore the pressure gradient mentioned above.

However, an alternative construction focuses on the aforementioned "wings". In essence, within at least one such "wing" area of the bottom portion, a hole 32, running through the bottom portion, is disposed, and within the hole we insert an elevatable rod 33. This rod is cylindrical and of a cross-section such that it fits within the hole 32 and may move vertically within the hole The hole and rod preferably are of circular, square or rectangular cross-section for convenience of manufacture. The length of the elevation rod 33 is greater than the thickness of the bottom portion 2, and in one state the top of the rod is flush with the inward-facing surface of the bottom portion 2, so the bottom of the rod extends below the bottom of the bottom portion 2. Upward pressure on bottom of the rod 33 causes it to move up through the hole 32, urging it against the underside of the reed 14, causing the reed 14 at that point to be clamped against the foam 3 even when the top and bottom portion are so separated that clamping at the wing area in question would not occur in the absence of the rod action.

The rod 33 may be spring-loaded within the hole so that it is biased so that in the absence of pressure from below the top of the rod will be flush with the inward facing surface of the bottom portion 5. In one embodiment, the hole 32 has an annular ceiling 34 that corresponds to the inward facing surface of the bottom portion 5. The elevatable rod 33 has a concentric disk shaped extension 35 near the bottom of the rod. A spring 36 is disposed between the annular ceiling 34 and the disk 35 so as to resist the attempt to move the rod 33 upward (which would compress the spring 36 between the ceiling and the disk).

Means may also be provided so that the rod doesn't fall out of the device when no pressure is exerted on the bottom of the rod.

The invention claimed is:

1. A device for producing a sound similar to an animal vocalization, said device having a mouthpiece end and a distal end, said device comprising a top portion comprising an inward-facing surface having a compressible foam lining covering at least a portion of that surface, a bottom portion comprising an inward-facing surface, a throat chamber formed in said bottom portion, said throat chamber having a top, a floor and a mouthpiece end, said throat chamber being open at said mouthpiece end thereof and at the top of said throat chamber, and comprising a ramp which rises from the floor of said throat chamber, means for releasably securing at least one vibratable reed with a desired tautness so that it covers at least a portion of said ramp and at least a portion of the inward-facing surface of said bottom portion, whereby the reed is in a bent configuration, and means for pivotably or vertically connecting said top portion and said bottom portion so that said device can assume a closed position in which the inward facing surfaces of said top and bottom portions are in contact and an open position in which said surfaces are not in contact, wherein said device, when said reed is secured therein, produces a sound when air is blown into it at the mouthpiece end of said throat chamber and the pitch of said sound is dependent on the tautness of said reed, the slope of said ramp, and, if the top and bottom portions are pivotably connected, the angle made by the inward facing surfaces of the top and bottom portions, and, if the top and bottom portions are vertically connected, the distance between the inward facing surfaces of the top and bottom portions.

2. The device of claim 1 which further comprises said vibratable reed.

3. The device of claim 1 wherein said ramp comprises at least one slot that runs parallel to the run of the ramp.

4. The device of claim 3 wherein said slot extends horizontally beyond the top of said ramp.

5. The device of claim 3, wherein the bottom portion further comprises two channels, beginning at or near the distal end of the device, that meet in a substantially V-shape near the distal end of said slot and communicate therewith.

6. The device of claim 5, wherein said securing means are slot-and-pin means.

7. The device of claim 3, wherein the ramp has a slope of about 45 degrees.

8. The device of claim 1, wherein the foam lining is composed of a closed cell foam.

9. The device of claim 1, wherein the device comprises means for pivotably connecting said top portion and said bottom portion, so that said device can assume a closed position in which the inward facing surfaces of said top and bottom portions are substantially parallel and an open position in which said surfaces are not substantially parallel, and the pitch of said sound is dependent at least in part on the angle made by the inward facing surfaces of the top and bottom portions.

10. The device of claim 9, wherein said means for pivotably connecting the two portions comprises a rubber ring or band engaging slots on said top and bottom portions.

11. The device of claim 10, said means for pivotably connecting the two portions further comprising pins for preventing the sliding of the top portion relative to the bottom portion or vice versa.

12. The device of claim 9, wherein the sound produced is dependent on the degree of compression of the foam lining as a result of the angle made by the inward facing surfaces of the top and bottom portions.

13. The device of claim 9, wherein the top and bottom portions are pivotably connected such that the pivot axis is at the mouthpiece end.

14. The device of claim 9 wherein said foam lining has a cross-section such that it is thicker where it is closer to the pivot axis.

15. The device of claim 1 wherein the device comprises means for the escape of air blown over or under said reed.

16. The device of claim 1 wherein said foam lining is of uniform thickness.

17. The device of claim 1 in which a portion of the inward-facing surface of the top portion is not covered by the foam lining and said portion is of a substantially triangular shape, with the shortest side facing the mouthpiece end of the device.

18. The device of claim 1 which further comprises two or three of said vibratable reeds.

19. The device of claim 18 wherein said reeds are stacked vertically, with partial horizontal overlap.

20. The device of claim 4 wherein said at least one slot in said ramp is a single central slot.

21. The device of claim 1 wherein the top and bottom portions are vertically connected so that said device can assume a closed position in which the inward facing surfaces of said top and bottom portions are in contact and an open position in which said surfaces are not in contact, said surfaces being substantially parallel to each other in both positions, the top and/or bottom portions being translated vertically in moving from the open to the closed position.

22. The device of claim 21 wherein the top and bottom portions are contained within a flexible tube in such manner that squeezing together the top and bottom of the flexible tube acts upon the top and bottom portions so as to move them closer together.

23. The device of claim 1 which does not comprise a coil spring as part of said means for pivotably or vertically connecting the top and bottom portions, the foam lining being sufficiently compressible so that in the closed position, it provides a sufficient restoring force so that if external pressure on the device is released, it returns to the open position.

24. The device of claim 21 wherein the foam lining is of variable thickness, being thickest nearest the mouthpiece end and thinnest nearest the distal end, and of intermediate thickness in-between.

25. The device of claim 21 which further comprises at least one slot in said ramp that runs parallel to the run of said ramp, and extends beyond the top of the ramp, at least one hole through said bottom portion is disposed beyond the top of the ramp between the slot and the side edge of the bottom portion.

26. The device of claim 25 wherein an elevatable rod is disposed in said hole, said rod having a length greater than the thickness of the bottom portion, such that upward pressure on the bottom of said rod exerts a clamping pressure on the underside of the reed when a reed is mounted in the device.

27. The device of claim 26 wherein the rod is spring-loaded, and means are provided for retaining it in the hole.

* * * * *